(12) United States Patent
Shimazawa

(10) Patent No.: US 10,162,589 B2
(45) Date of Patent: Dec. 25, 2018

(54) DATA COMMUNICATION DEVICE, INFORMATION VISUALIZING SYSTEM AND DATA COMMUNICATING PROGRAM

(71) Applicant: WingArc1st Inc., Tokyo (JP)

(72) Inventor: Ko Shimazawa, Tokyo (JP)

(73) Assignee: WingArc1st Inc., Tokyo (JP)

( * ) Notice: Subject to any disclaimer, the term of this patent is extended or adjusted under 35 U.S.C. 154(b) by 0 days.

(21) Appl. No.: 15/377,101

(22) Filed: Dec. 13, 2016

(65) Prior Publication Data

US 2017/0206046 A1    Jul. 20, 2017

(30) Foreign Application Priority Data

Jan. 19, 2016 (JP) .................................. 2016-008093

(51) Int. Cl.
| | |
|---|---|
| *G06F 3/14* | (2006.01) |
| *H04L 29/08* | (2006.01) |
| *H04L 12/26* | (2006.01) |
| *G06F 7/24* | (2006.01) |
| *G06T 11/60* | (2006.01) |

(52) U.S. Cl.
CPC .................. *G06F 3/14* (2013.01); *G06F 7/24* (2013.01); *G06T 11/60* (2013.01); *H04L 43/045* (2013.01); *H04L 67/2828* (2013.01); *G09G 2340/02* (2013.01); *G09G 2370/022* (2013.01); *G09G 2370/10* (2013.01)

(58) Field of Classification Search
CPC ........................................................ G06F 3/14
USPC ........................................................ 345/629
See application file for complete search history.

(56) References Cited

U.S. PATENT DOCUMENTS

| | | | | |
|---|---|---|---|---|
| 2002/0089517 A1* | 7/2002 | Ludtke | ...................... | G06F 3/14 345/629 |
| 2004/0117377 A1* | 6/2004 | Moser | ................. | H04L 67/2823 |
| 2007/0030288 A1* | 2/2007 | Yamamoto | ................ | G06F 3/13 345/629 |
| 2007/0252852 A1* | 11/2007 | Ban | .......................... | G09G 5/42 345/629 |
| 2008/0084473 A1* | 4/2008 | Romanowich | ... | G08B 13/19671 348/135 |

(Continued)

FOREIGN PATENT DOCUMENTS

| | | |
|---|---|---|
| JP | 05-191454 A | 7/1993 |
| JP | 2005-258582 A | 9/2005 |

(Continued)

*Primary Examiner* — Javid A Amini

(74) *Attorney, Agent, or Firm* — Polsinelli PC

(57) ABSTRACT

There are provided a changed data extracting unit 13 for extracting only changed data to be present data changed from previous data for each of data to be received repetitively from a plurality of portable terminals 200, a block data generating unit 14 for collecting, into one, any of the changed data which are extracted and have the same value, thereby generating block data, and a data transmitting unit 15 for transmitting the generated block data, and only data changed from previous receipt to present receipt in a huge amount of data which are collected from the large number of portable terminals 200 and might be changed moment by moment are extracted as transmitting target data, and furthermore, the changed data having the same value are collected into one and transmitted if any. Consequently, a transmission data volume can be reduced.

6 Claims, 7 Drawing Sheets

(56) References Cited

U.S. PATENT DOCUMENTS

| | | | |
|---|---|---|---|
| 2009/0284551 A1* | 11/2009 | Stanton | G06F 3/14 |
| | | | 345/629 |
| 2009/0292718 A1* | 11/2009 | Cuneo | G06F 17/30398 |
| 2010/0103189 A1* | 4/2010 | Hao | G06Q 40/06 |
| | | | 345/593 |
| 2011/0138123 A1* | 6/2011 | Gurajada | G06F 17/30595 |
| | | | 711/118 |
| 2012/0147020 A1* | 6/2012 | Hussain | G06T 1/00 |
| | | | 345/522 |
| 2015/0113045 A1* | 4/2015 | Tanaka | G06F 17/30592 |
| | | | 709/203 |
| 2015/0134558 A1* | 5/2015 | Murray | G06Q 10/0833 |
| | | | 705/333 |

FOREIGN PATENT DOCUMENTS

| | | |
|---|---|---|
| JP | 2006-115257 A | 4/2006 |
| JP | 2011-060039 A | 3/2011 |
| JP | 2013-045238 A | 3/2013 |

\* cited by examiner

DATA COMMUNICATION DEVICE, INFORMATION VISUALIZING SYSTEM AND DATA COMMUNICATING PROGRAM

CROSS REFERENCE TO RELATED APPLICATIONS

This application is claims priority to Application No. 2016-008093 filed in Japan on Jan. 19, 2016 under 35 U.S.C. § 119. The entire contents of this application are hereby incorporated by reference.

BACKGROUND OF THE INVENTION

Field of the Invention

The present invention relates to a data communication device, an information visualizing system and a data communicating program and is suitably used in an information visualizing system for analyzing data collected in a server from a plurality of portable terminals and visualizing a result of the analysis to provide the visualized result to a terminal of a display request source and to display the visualized result thereon, for example.

Description of the Related Art

Conventionally, there is provided an information visualizing system for analyzing many data collected in a server from a large number of portable terminals and visualizing a result of the analysis so as to be easily understood visually, providing the visualized result to a client terminal and displaying the visualized result thereon. As an example of the information visualizing system, there is known a geographic information system (GIS) for visualizing a result of analysis and displaying the visualized result on a map (for example, see Patent Documents 1 and 2).

Referring to the map displaying system described in the Patent Document 1, a server receives and stores a current place from a portable terminal carried by a pedestrian or the like or an on-vehicle terminal through internet. Then, there are generated map image data for displaying a map image where a user mark representing an area including a current place of a corresponding terminal and indicating a current place of a pedestrian in the area or a vehicle mark indicative of a current place of a vehicle is drawn, and the map image data are transmitted to a corresponding terminal. On the other hand, a terminal receiving the map image data displays a map image through a web browser based on the map image data.

In the viewing possibility information providing system described in the Patent Document 2, a portable apparatus periodically detects a current position and decides a viewing possibility of a television broadcasting signal of at least one broadcasting station in that position. A result of the decision is accumulated in a server through a communication network. Based on the accumulated data, indices representing the results of the decision are superimposed and displayed in respective positions on a map around the current position.

Referring to the system for collecting a large number of data from a large number of portable terminals and analyzing them through a server and displaying marks representing current positions of the respective portable terminals on map images one by one in superimposition as described in the Patent Documents 1 and 2, map image data to be generated by the server and transmitted to a client terminal have an enormous data volume so that a communication load is extremely large. For this reason, there is a problem in that a long time is taken for communication and a turnaround time for displaying a map image on the client terminal is thus prolonged. In particular, it is hard to update, in real time, information which might be changed moment by moment, for example, a current position, a result of decision of a viewing possibility or the like and to display them on the client terminal.

There is known the technology for transmitting only difference data having a change generated, thereby reducing a communication load (see Patent Documents 3 to 5, for example). In the information management system described in the Patent Document 3, a mobile station device (a vehicle server) is provided in a mobile station (a war vessel) and serves to record data to be collected in the mobile station and to transmit difference information indicative of a changed part of data to a fixed station in a predetermined cycle.

Referring to the data transfer method descried in the Patent Document 4, when packetizing monitored information in a monitored device and transmitting the packetized information to a monitoring device through a transmission path, it is possible to efficiently use a transmission path having a limited capacity by extracting only a changed part of the packetized information to transmit a difference packet with a transmission packet data volume reduced.

Referring to the data difference distributing method of the compressed described in the Patent Document 5, it is possible to reduce a data size to be distributed, thereby shortening a time required for distribution by distributing a difference between old data and new data.

[Patent Document 1] Japanese Laid-Open Patent Publication No. 2013-45238
[Patent Document 2] Japanese Laid-Open Patent Publication No. 2006-115257
[Patent Document 3] Japanese Laid-Open Patent Publication No. 2005-258582
[Patent Document 4] Japanese Laid-Open Patent Publication No. 1993-191454
[Patent Document 5] Japanese Laid-Open Patent Publication No. 2011-60039

DISCLOSURE OF THE INVENTION

As in the Patent Documents 3 to 5, generally, only difference data are transmitted to reduce a communication data volume. However, this is insufficient for visualizing, in real time, a huge amount of information changeable moment by moment and providing them to the client terminal.

The present invention has been made in order to solve the problem and has an object to enable a huge amount of information collected from a large number of portable terminals and changeable moment by moment to be visualized in real time and to be provided to a client terminal.

In order to achieve the object, in the present invention, it is decided whether or not present data to be data received at this time are changed from previous data to be data received previously for each of data received repetitively from a plurality of portable terminals and only the present changed data which are changed are extracted as changed data together with respective identification information. Furthermore, any of the changed data which are extracted and have the same value are collected into one and the changed data thus collected is associated with a plurality of corresponding identification information to generate block data, and the block data thus generated are transmitted.

According to the present invention having the structure described above, there are extracted, as transmitting target data, only data changed from previous receipt to present receipt in a huge amount of data which are collected from a large number of portable terminals and might be changed moment by moment. Consequently, a transmission data volume can be reduced. In addition, if there is a plurality of changed data having the same value, they are collected into one and transmitted. Therefore, a transmission data volume can further be reduced. Consequently, a data volume to be transmitted to a client terminal can be reduced considerably so that a communication load can be decreased remarkably. Therefore, a huge amount of information which might be changed moment by moment can be visualized in real time and provided to the client terminal.

DETAILED DESCRIPTION OF THE PREFERRED EMBODIMENTS

First Embodiment

Figure 1:
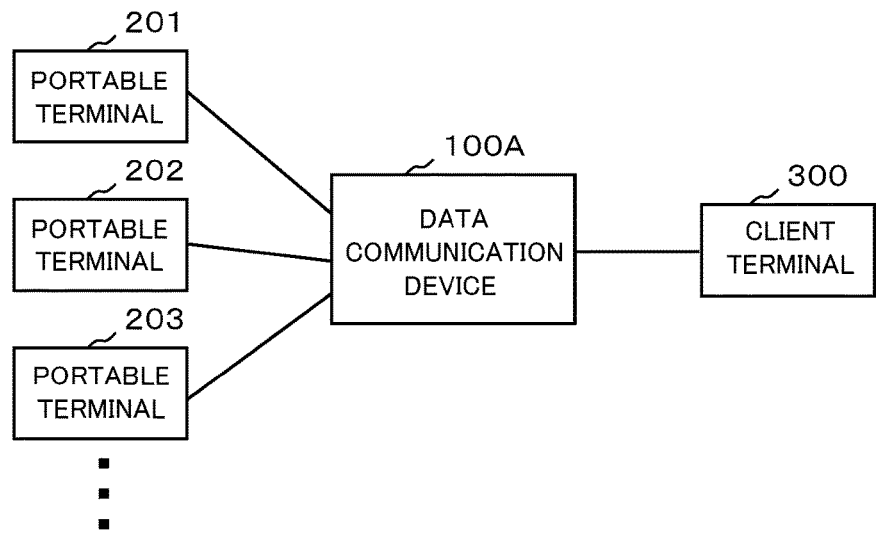
FIG. 1 is a diagram showing an example of a structure of a communicating system which applies a data communication device according to a first embodiment.
Figure 2:
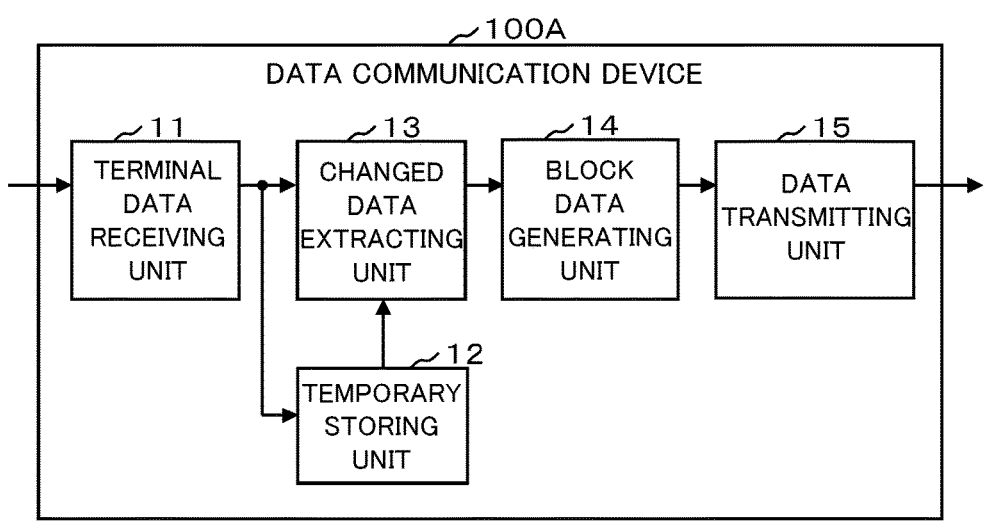
FIG. 2 is a block diagram showing an example of a functional structure of the data communication device according to the first embodiment.

A first embodiment according to the present invention will be described below with reference to the drawings. FIG. 1 is a diagram showing an example of a structure of a communicating system which applies a data communication device according to the first embodiment. FIG. 2 is a block diagram showing an example of a functional structure of the data communication device according to the first embodiment.

As shown in FIG. 1, a data communication device 100A according to the first embodiment is configured to be connectable through a network such as INTERNET to a plurality of portable terminals 201, 202, 203, . . . , (which will be hereinafter referred to as a portable terminal 200) and a client terminal 300.

The portable terminal 200 is a terminal related to an information source of data which is a target of data processing to be performed in the data communication device 100A. The portable terminal 200 is a smartphone, a tablet terminal, a portable telephone, a notebook computer, a car navigation device or the like, for example.

The client terminal 300 is a terminal for acquiring and displaying a result of the data processing in the data communication device 100A. The client terminal 300 is a separate terminal from the portable terminal 200 and is a personal computer, for example. The client terminal 300 may be any of the portable terminals 201, 202, 203, . . . .

As shown in FIG. 2, the data communication device 100A according to the first embodiment includes, as a functional structure thereof, a terminal data receiving unit 11, a temporary storing unit 12, a changed data extracting unit 13, a block data generating unit 14 and a data transmitting unit 15. These functional blocks 11 to 15 can also be configured from any of hardware, a DSP (Digital Signal Processor) and software. For example, if the respective functional blocks 11 to 15 are configured from the software, they actually include a CPU, an RAM, an ROM and the like in a computer and are implemented by an operation of a program stored in a recording medium such as the RAM, the ROM, a hard disk or a semiconductor memory.

The terminal data receiving unit 11 repetitively receives data which can be changed with the passage of time from the portable terminals 201, 202, 203, . . . . The data which can be changed with the passage of time are data (hereinafter referred to as terminal data), for example, current position information representing a position where the portable terminal 200 is present, operating state information representing an operating state of the portable terminal 200, user situation information representing a situation of a user using the portable terminal 200 and the like. The terminal data may be information to be detected automatically by the portable terminal 200 or information to be input by a user. The terminal data receiving unit 11 receives, at any time, terminal data to be transmitted periodically by the portable terminal 200 or in response to a user operation.

The temporary storing unit 12 temporarily stores the terminal data received by the terminal data receiving unit 11. This is intended for enabling comparison between terminal data received at this time and terminal data received previously. The comparison is individually performed for each terminal data to be transmitted from the portable terminal 200. For this reason, it is necessary to identify any of the portable terminals 200 from which the terminal data transmitted from the portable terminals 201, 202, 203, . . . are sent respectively. In order to perform the identification, the individual terminal data are associated with predetermined identification information and are thus managed.

The identification information to be associated with the terminal data is given when the terminal data is to be transmitted from the portable terminal 200 to the data communication device 100A. As the identification information, for example, it is possible to use an IP address, a MAC address, a serial number or the like which is peculiar to the portable terminal 200. Alternatively, it is also possible to use a preset user ID as the identification information.

The identification information may be given through the data communication device 100A. For example, the terminal data receiving unit 11 of the data communication device 100A may identify the portable terminal 200 transmitting the terminal data and give predetermined identification information to each of the terminal data of the portable terminal 200 thus identified based on cookie information or the like.

The changed data extracting unit 13 decides whether or not data received at this time (which will be hereinafter referred to as present data) are changed from data received previously and stored in the temporary storing unit 12 (which will be hereinafter referred to as previous data) for each of the terminal data to be received from the portable terminals 201, 202, 203, . . . by the terminal data receiving unit 11, and extracts only the present data that are changed (which will be hereinafter referred to as changed data) together with the respective identification information. The changed data extracting unit 13 executes the changed data extraction processing periodically and repetitively.

Figure 3A:
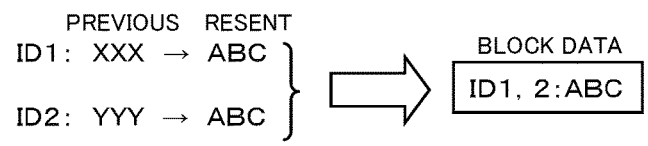
FIGS. 3A and 3B are diagrams for explaining a processing content of a block data generating unit according to the first embodiment.
Figure 3B:
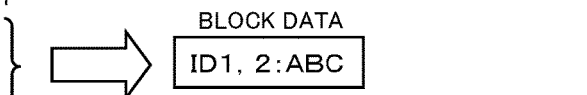

The block data generating unit 14 collects, into one, any of the changed data extracted by the changed data extracting unit 13 and having the same value, and associates the changed data thus collected with a plurality of corresponding identification information, thereby generating block data. For example, as shown in FIG. 3A, it is assumed that changed data (value of the present data) of identification information "ID 1" is "ABC" and changed data of identification information "ID 2" is also "ABC". In this case, the block data generating unit 14 collects these two changed data into one and associates the collected changed data with two identification information "ID 1, 2" to form one block data as shown in FIG. 3B. The block data generating unit 14 repetitively executes the block data generation processing every time the changed data extracting unit 13 extracts the changed data.

The data transmitting unit 15 transmits the block data generated by the block data generating unit 14 to the client terminal 300. For example, the data transmitting unit 15 transmits the block data generated by the block data generating unit 14 to the client terminal 300 as a response when a request for acquiring terminal data on the portable terminals 201, 202, 203, . . . is given from the client terminal 300. The data transmitting unit 15 transmits, to the client terminal 300 at any time, the block data to be generated at any time by the block data generating unit 14 in relation to the changed data to be extracted periodically by the changed data extracting unit 13.

The client terminal 300 expands the block data transmitted from the data communication device 100A to the individual terminal data. Then, there are updated only the expanded terminal data in the terminal data related to the portable terminals 201, 202, 203, . . . stored in the client terminal 300. Herein, the identification information is associated with the terminal data in the block data. Therefore, the client terminal 300 can identify which one of the terminal data are to be updated.

According to the first embodiment, thus, only the data changed from the previous receipt to the present receipt in the terminal data collected in the data communication device 100A from the portable terminals 201, 202, 203, . . . (a huge amount of data which might be changed moment by moment) are extracted as data to be a transmitting target. Therefore, a transmission data volume is reduced. In addition, if there are a plurality of changed data having the same value, they are collected into one to be transmitted. Therefore, the transmission data volume is further reduced. Consequently, a data volume for transmission to the client terminal 300 can be reduced considerably so that a communication load can be decreased remarkably. Therefore, a huge amount of information which might be changed moment by moment can be provided to the client terminal 300 in real time.

Second Embodiment

Figure 4:
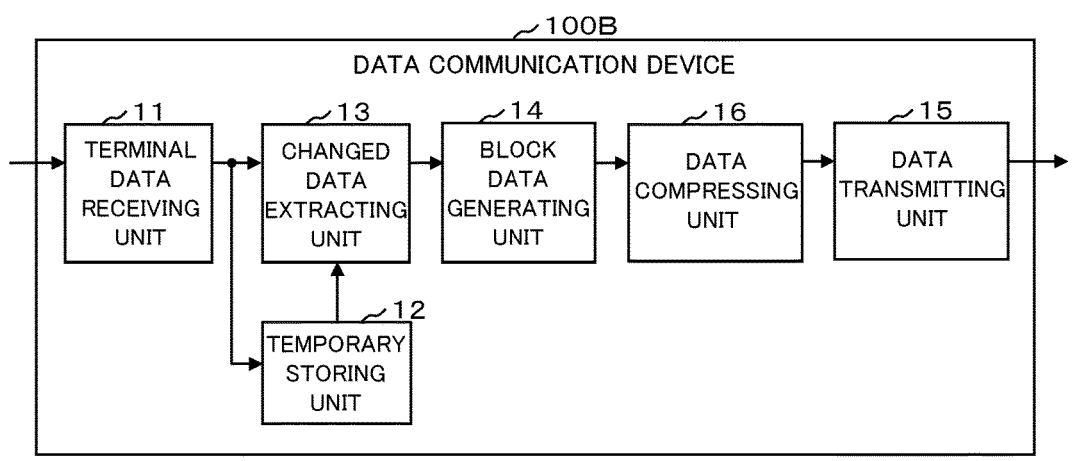
FIG. 4 is a block diagram showing an example of a functional structure of a data communication device according to a second embodiment.

Next, a second embodiment according to the present invention will be described with reference to the drawings. FIG. 4 is a block diagram showing an example of a functional structure of a data communication device 100B according to the second embodiment. In FIG. 4, components having the same reference numerals as those shown in FIG. 2 have the same functions. For this reason, repetitive description will be omitted. As shown in FIG. 4, the data communication device 100B according to the second embodiment further includes a data compressing unit 16.

Although the data compressing unit 16 rearranges a plurality of block data generated by the block data generating unit 14 in such a manner that the block data having the same data types of the changed data therein are arranged consecutively to each other, and compresses a serial rearranged data by a predetermined compressing method. Although the compressing method is optional, it is possible to apply a Deflate based compressing method (ZLIB as an example), for instance.

The Deflate based compressing method serves to replace, with a shorter sign, the arrangement of values which has already come out if it comes out again. However, if it is retrieved by endlessly going back whether the value has already come out, the processing becomes heavy. Therefore, a range for the retrieval is generally limited to perform compression. By rearranging the block data in such a manner that the block data having the same data type of the changed data therein are arranged consecutively to each other as described above, therefore, it is possible to increase a compression ratio.

Figure 5A:
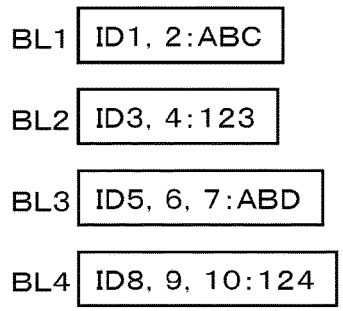
FIGS. 5A and 5B are diagrams for explaining the content of a compression processing to be performed by a data compressing unit according to the second embodiment.
Figure 5B:
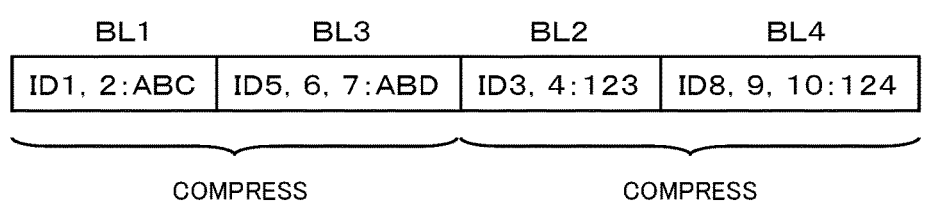

FIGS. 5A and 5B are diagrams for explaining the content of a compression processing to be performed by the data compressing unit 16. In an example of FIGS. 5A and 5B, four block data are generated by the block data generating unit 14. As shown in FIG. 5A, changed data included in first block data BL1 is "ABC" having a data type of a character type. Changed data included in second block data BL2 is "123" having a data type of a numeric type. Changed data included in third block data BL3 is "ABD" having a data type of a character type. Changed data included in fourth block data BL4 is "124" having a data type of a numeric type.

In this case, the data compressing unit 16 rearranges the four block data BL1 to BL4 in such a manner that the two block data BL1 and BL3 in which the changed data have a data type of a character type are arranged consecutively and the two block data BL2 and BL4 in which the changed data have a data type of a numeric type are arranged consecutively. Then, the data compressing unit 16 compresses a serial rearranged data by the Deflate based compressing method. In this case, there is increased a possibility that encoding might be performed in the block data BL1 and BL3 portions in which the changed data of the character type are arranged, and furthermore, the encoding might be performed in the block data BL2 and BL4 portions in which the changed data of the numeric type are arranged.

According to the second embodiment, thus, the data compression is performed by the data compressing unit 16 in addition to the extraction of only the changed data through the changed data extracting unit 13 and the generation of the block data through the block data generating unit 14. Therefore, the transmission data volume can further be reduced. Herein, the block data generated by the block data generating unit 14 are not simply compressed but the block data having the same data type of the changed data therein are rearranged consecutively to each other, and are thus compressed. Therefore, the compression ratio can be increased.

Third Embodiment

Figure 6:
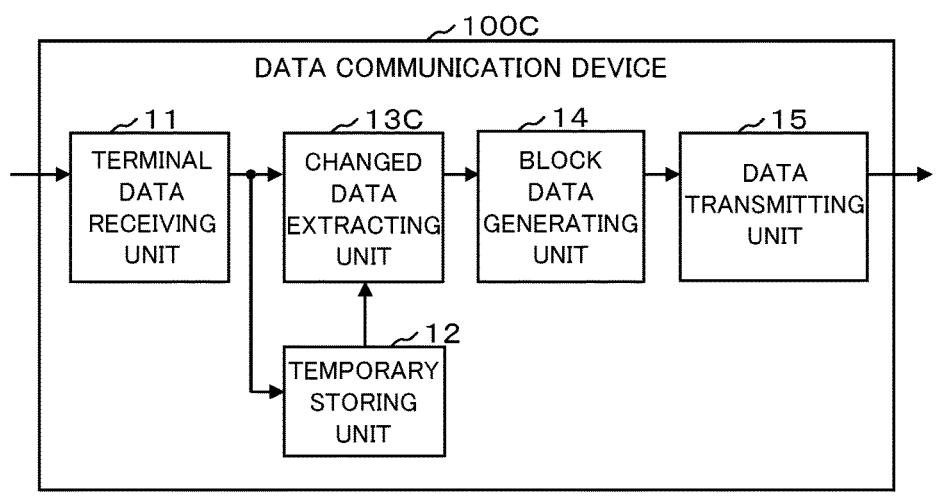
FIG. 6 is a block diagram showing an example of a functional structure of a data communication device according to a third embodiment.

Next, a third embodiment according to the present invention will be described with reference to the drawings. FIG. 6 is a block diagram showing an example of a functional structure of a data communication device 100C according to the third embodiment. In FIG. 6, components having the same reference numerals as those shown in FIG. 2 have the same functions. Therefore, repetitive description will be omitted. As shown in FIG. 6, the data communication device 100C according to the third embodiment includes a changed data extracting unit 13C in place of the changed data extracting unit 13.

The changed data extracting unit 13C sets, as reference data, any of changed data extracted in the same manner as in the first embodiment and calculates a difference between changed data other than the reference data and the other changed data. Then, the changed data extracting unit 13C extracts the reference data and the difference data as the changed data together with respective identification information.

For example, as shown in FIG. 5A, it is assumed that changed data "123" are extracted for IDs 3 and 4 and changed data "124" are extracted for IDs 8, 9 and 10 by the changed data extracting unit 13C. In this case, the changed data extracting unit 13C further determines, as the reference data, one of the changed data for IDs 3, 4, 8, 9 and 10. As an example, the changed data for the smallest number ID 3 is determined as the reference data. The changed data extracting unit 13C calculates a difference between the changed data for the other IDs 4, 8, 9 and 10 and the other changed data other than own changed data and replaces the changed data with difference data.

Herein, the "other changed data" can be set to be last changed data in the arrangement of the changed data with the reference data set to be a head. Although how to arrange the changed data is optional, it can be supposed to arrange the changed data in ascending order of the IDs, for example. In this case, the last changed data of the ID 3 is the "other changed data" for the changed data of the ID 4. The changed data extracting unit 13C calculates a difference between the changed data of the ID 4 and the changed data of the ID 3 and replaces the changed data of the ID 4 with the difference data. The last changed data of the ID 4 is the "other changed data" for the changed data of the ID 8. The changed data extracting unit 13C calculates a difference between the changed data of the ID 8 and the changed data of the ID 4 and replaces the changed data of the ID 8 with the difference data. Similarly, the changed data extracting unit 13C calculates a difference between the changed data of the ID 9 and the last changed data of the ID 8 and calculates a difference between the changed data of the ID 10 and the last changed data of the ID 9 and sets the difference to be difference data.

As another example, moreover, the "other changed data" can also be set to be the reference data. In this case, in relation to any of the changed data of the IDs 4, 8, 9 and 10, the changed data of the ID 3 determined as the reference data is the "other changed data" and a difference between each of the changed data of the IDs 4, 8, 9 and 10 and the changed data of the ID 3 is calculated and replaced with difference data.

Figure 7:
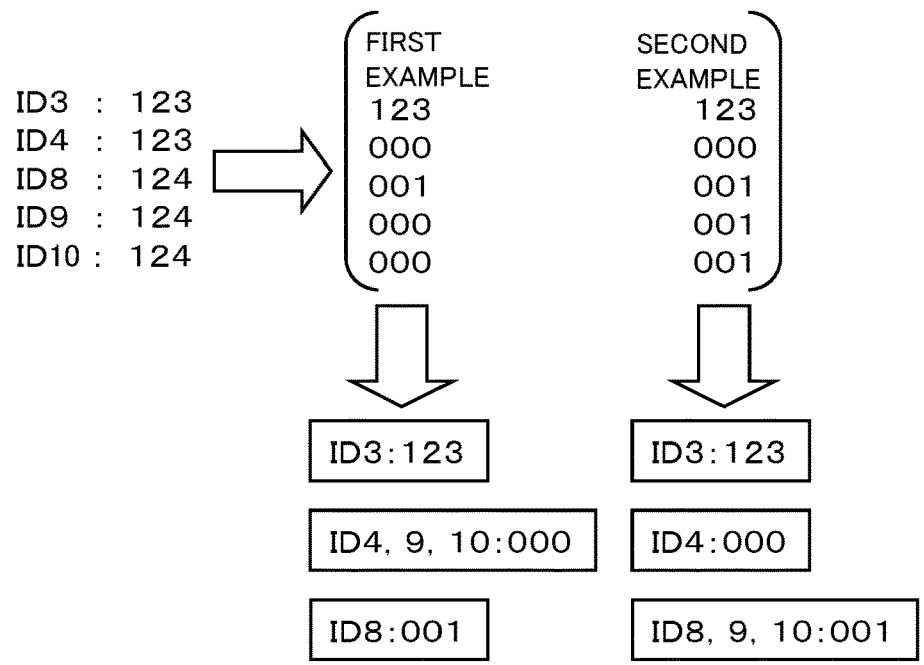
FIG. 7 is a diagram for explaining the processing contents of a changed data extracting unit and a block data generating unit according to the third embodiment.

FIG. 7 is a diagram for explaining the processing contents of the changed data extracting unit 13C and the block data generating unit 14 according to the third embodiment. In the same manner as in FIG. 5A, there is shown an example of the case in which the changed data "123" are extracted for the IDs 3 and 4 and the changed data "124" are extracted for the IDs 8, 9 and 10 by the changed data extracting unit 13C.

In a first example shown in FIG. 7, a plurality of changed data are arranged in ascending order of IDs and ID 3 of the smallest number is set to be the reference data, and a difference between each of the changed data of the other IDs 4, 8, 9 and 10 and the last changed data is calculated and replaced with difference data. In other words, since ID 3 is the reference data, the changed data "123" are maintained. The changed data of the IDs 4, 8, 9 and 10 are replaced with difference data "000", "001", "000" and "000", respectively.

The changed data extracting unit 13C extracts the reference data of the ID 3 and the difference data of the IDs 4, 8, 9 and 10 as the changed data together with respective identification information and supplies them to the block data generating unit 14. In this case, the block data generating unit 14 collects the difference data "000" of the IDs 4, 9 and 10 into one and associates it with the three identification information "ID 4, 9 and 10" to form one block data. In relation to each of the ID 3 and ID 8, one block data is formed by only one changed data, respectively.

On the other hand, in a second example shown in FIG. 7, the ID 3 having the smallest number in the changed data is set to be the reference data and a difference between each of the changed data of the IDs 4, 8, 9 and 10 and the reference data is calculated for the other IDs 4, 8, 9 and 10 and is replaced with difference data. In other words, since the ID 3 is the reference data, the changed data "123" is maintained, and the changed data of the IDs 4, 8, 9 and 10 are replaced with the difference data "000", "001", "001" and "001", respectively.

The changed data extracting unit 13C extracts the reference data of the ID 3 and the difference data of the IDs 4, 8, 9 and 10 as the changed data together with respective identification information and supplies them to the block data generating unit 14. In this case, the block data generating unit 14 collects the difference data "001" of the IDs 8, 9 and 10 into one and associates the collected data with the three identification information "IDs 8, 9, 10" to form one block data. In relation to the IDs 3 and 4, one block data is formed by only one changed data, respectively.

According to the third embodiment, thus, the changed data other than the reference data can be expressed, as the difference data, in a small value. Therefore, it is possible to decrease the number of digits required for the changed data. Consequently, the data volume to be transmitted from the data transmitting unit 15 to the client terminal 300 can further be reduced.

In the third embodiment, the data compressing unit 16 described in the second embodiment may further be provided. Thus, the transmission data volume can further be reduced.

In the third embodiment, moreover, the block data generating unit 14 may calculate the difference between the changed data in place of the calculation of the difference between the changed data by the changed data extracting unit 13C. In this case, the block data generating unit 14 sets any of the generated block data as the reference data and calculates a difference between the changed data in the block data other than the reference data and the changed data in the other block data. Herein, the "other block data" may be set to be last block data in the arrangement of the block data with the reference data set to be a head or may be the reference data.

Fourth Embodiment

Figure 8:
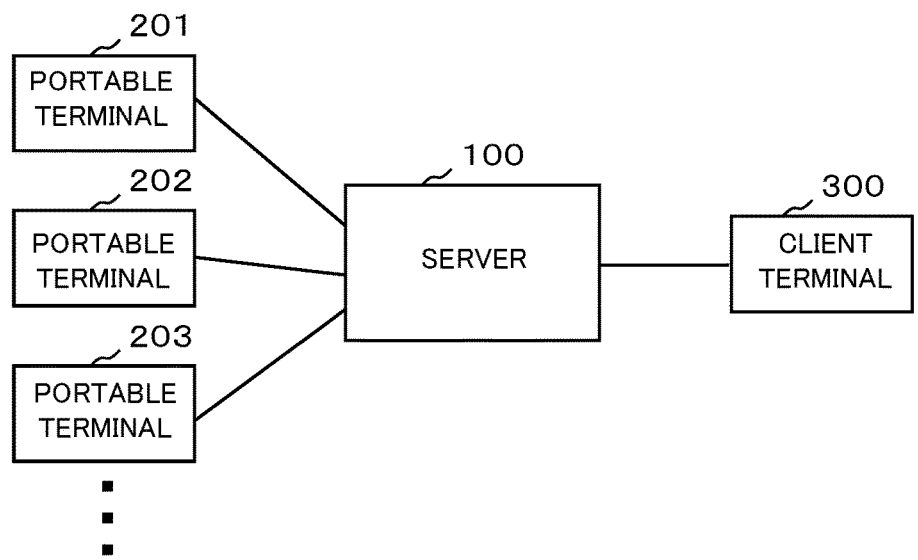
FIG. 8 is a diagram showing an example of a structure of an information visualizing system according to a fourth embodiment.
Figure 9:
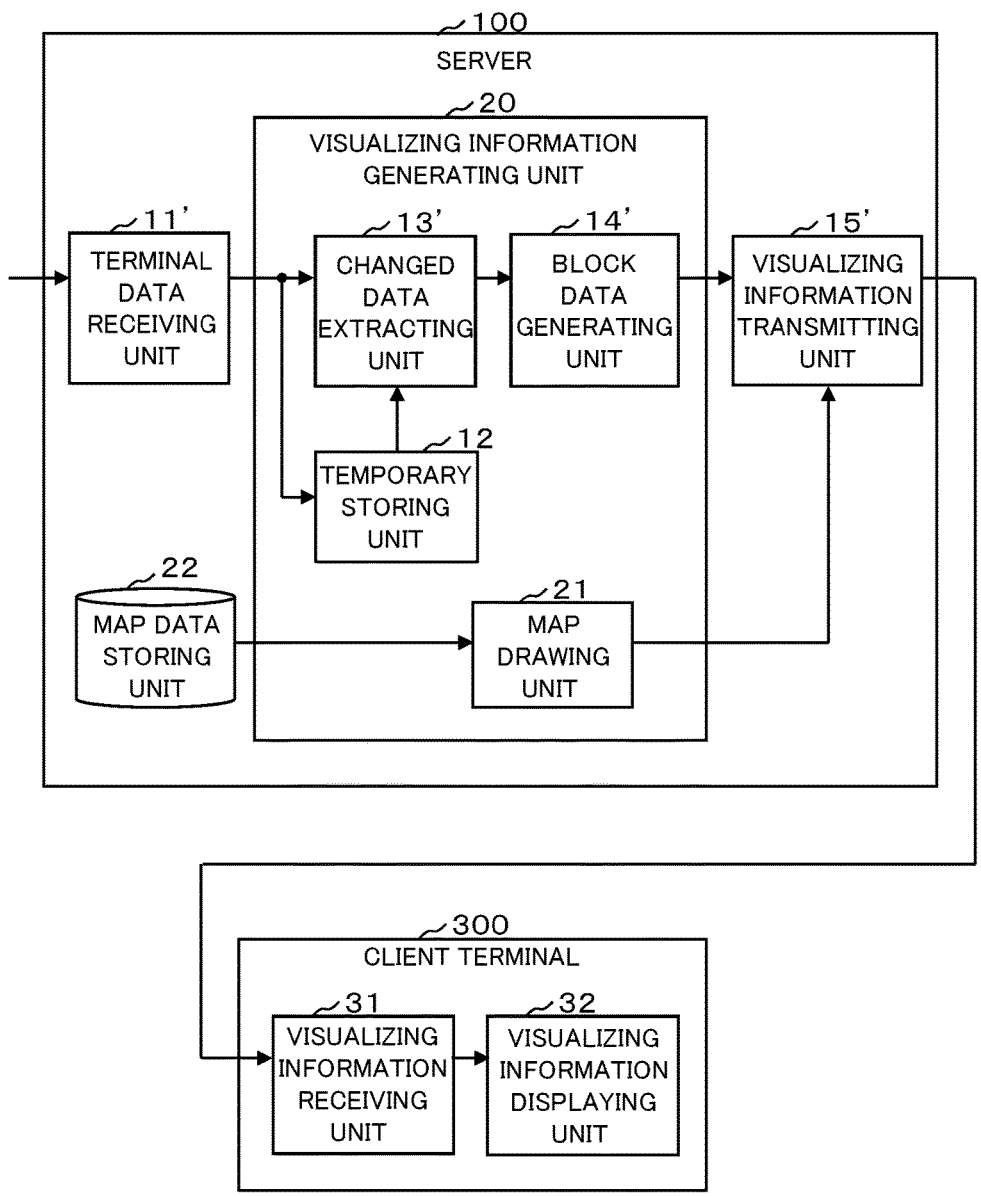
FIG. 9 is a block diagram showing an example of a functional structure of the information visualizing system according to the fourth embodiment.

Next, a fourth embodiment according to the present invention will be described with reference to the drawings. The fourth embodiment relates to an information visualizing system configured by applying any of the first to third embodiments. FIG. 8 is a diagram showing an example of a whole structure of the information visualizing system according to the fourth embodiment. FIG. 9 is a block diagram showing an example of a functional structure of the information visualizing system according to the fourth embodiment.

As shown in FIG. 8, the information visualizing system according to the fourth embodiment has a plurality of portable terminals 201, 202, 203, . . . , a server 100 and a client terminal 300 connected through a network such as INTERNET, and serves to analyze data collected in the server 100 from the portable terminals 201, 202, 203, . . . , to visualize a result of the analysis, to provide the visualized result to the client terminal 300 and to display the result thereon.

As shown in FIG. 9, the server 100 includes a terminal data receiving unit 11', a visualized information generating unit 20 and a visualized information transmitting unit 15' as a functional structure thereof. The visualized information generating unit 20 includes a temporary storing unit 12, a changed data extracting unit 13', a block data generating unit 14' and a map drawing unit 21 as a specific functional structure. Moreover, the server 100 includes a map data storing unit 22. The client terminal 300 includes a visualized information receiving unit 31 and a visualized information displaying unit 32.

The terminal data receiving unit 11' repetitively receives, from the portable terminals 201, 202, 203, . . . terminal data including current position information and predetermined management information as data which might be changed with the passage of time. It is assumed that the management information is status information representing a situation of a user using the portable terminal 200, for example. As an example, an employee of an enterprise possesses the portable terminal 200 and the terminal data receiving unit 11' repetitively receives status information representing a situation of the employee (during a customer service, a work, a rest or the like) as the terminal data together with the current position information. The current position information is detected by a GPS receiver or the like including the portable terminal 200 and the status information is input through an operation of the portable terminal 200 by the employee.

The visualized information generating unit 20 generates visualizing information for causing the client terminal 300 to display a map image drawn in superimposition of a mark representing a state of the portable terminal 200 (a status of the employee to use the portable terminal 200) indicated by management information received by the terminal data receiving unit 11' in a current position indicated by the current position information received by the terminal data receiving unit 11'.

Figure 10:
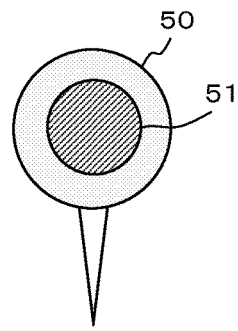
FIG. 10 is a view showing an example of a mark to be displayed by a visualizing information displaying unit according to the fourth embodiment.

FIG. 10 is a view showing an example of a mark to be displayed on the client terminal 300. In the example of FIG. 10, a pin mark 50 is used as a mark to be displayed in the current position on the map image, and a status display region 51 taking a circular shape is provided on a center of the pin mark 50. The status of the employee is displayed to enable identification through a display color, a display pattern or the like of the status display region 51, for example.

The visualizing information generating unit 20 generates visualizing information required for displaying the pin mark 50 shown in FIG. 10 in superimposition in the current position on the map image. The visualizing information is constituted by block data to be generated by the temporary storing unit 12, the changed data extracting unit 13' and the block data generating unit 14' and map image data to be drawn by the map drawing unit 21 based on map data stored in the map data storing unit 22.

The changed data extracting unit 13' decides whether present data are changed from previous data for each of the current position information and the management information to be received from the portable terminals 201, 202, 203, . . . by the terminal data receiving unit 11', and extracts only the changed data to be present data which are changed together with respective identification information. Herein, there might be the case in which only the current position information is changed, the case in which only the management information is changed and the case in which both of the current position information and the management information are changed in relation to one of the portable terminals 200. In the case in which both of the current position information and the management information are changed, two changed data related to the current position information and the management information are extracted in a state in which they are associated with one identical identification information.

The block data generating unit 14' collects any of the changed data extracted by the changed data extracting unit 13' and having the same value into one and associates the changed data thus collected with a plurality of corresponding identification information, thereby generating block data.

The visualizing information transmitting unit 15' transmits the visualizing information (the block data and the map image data) generated by the visualizing information generating unit 20 to the client terminal 300 to be a display request source. For example, the client terminal 300 to be the display request source can be a personal computer for a manager which is provided in an office of an enterprise. The visualizing information receiving unit 31 of the client terminal 300 receives the visualizing information transmitted by the visualizing information transmitting unit 15'.

The visualizing information displaying unit 32 updates the drawing of the pin mark 50 and displays the updated drawing in superimposition on the map image in relation to at least one of a current position and a status of an employee which are indicated by corresponding changed data (at least one of the current position information and the management information) every identification information included in the block data based on the visualizing information (the block data and the map image data) received by the visualizing information receiving unit 31.

Figure 11:
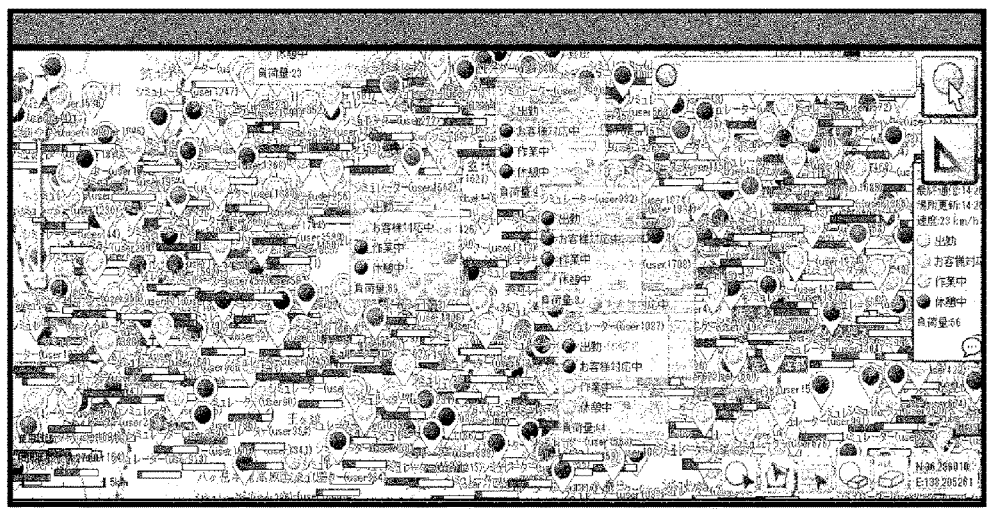
FIG. 11 is a view showing an example of a screen to be displayed by the visualizing information displaying unit according to the fourth embodiment.

FIG. 11 is a view showing an example of a screen to be displayed by the visualizing information displaying unit 32. In the displayed screen shown in FIG. 11, in relation to IDs having only the current position information changed, a display manner of the status display region 51 is not changed but only a display position of the pin mark 50 is changed to the newest current position which is to be displayed on the map image. On the other hand, in relation to the IDs having only the management information changed, the display position of the pin mark 50 is not changed but the display manner of the status display region 51 is changed to a manner representing the newest status which is to be displayed on the map image. In relation to the IDs having both of the current position information and the management information changed, moreover, the display position of the pin mark 50 and the display manner of the status display region 51 are changed into the newest state which is to be displayed on the map image.

According to the fourth embodiment, thus, when analyzing a huge amount of terminal data (the current position information and the management information) which are collected from a large number of portable terminals 201, 202, 203, ... and might be changed moment by moment and providing them as visualizing information to the client terminal 300, it is possible to considerably decrease a data volume to be transmitted to the client terminal 300 and to remarkably reduce a communication load. Therefore, it is possible to visualize, in real time, the huge amount of information which might be changed moment by moment and to provide the visualized information to the client terminal 300.

Figure 12:
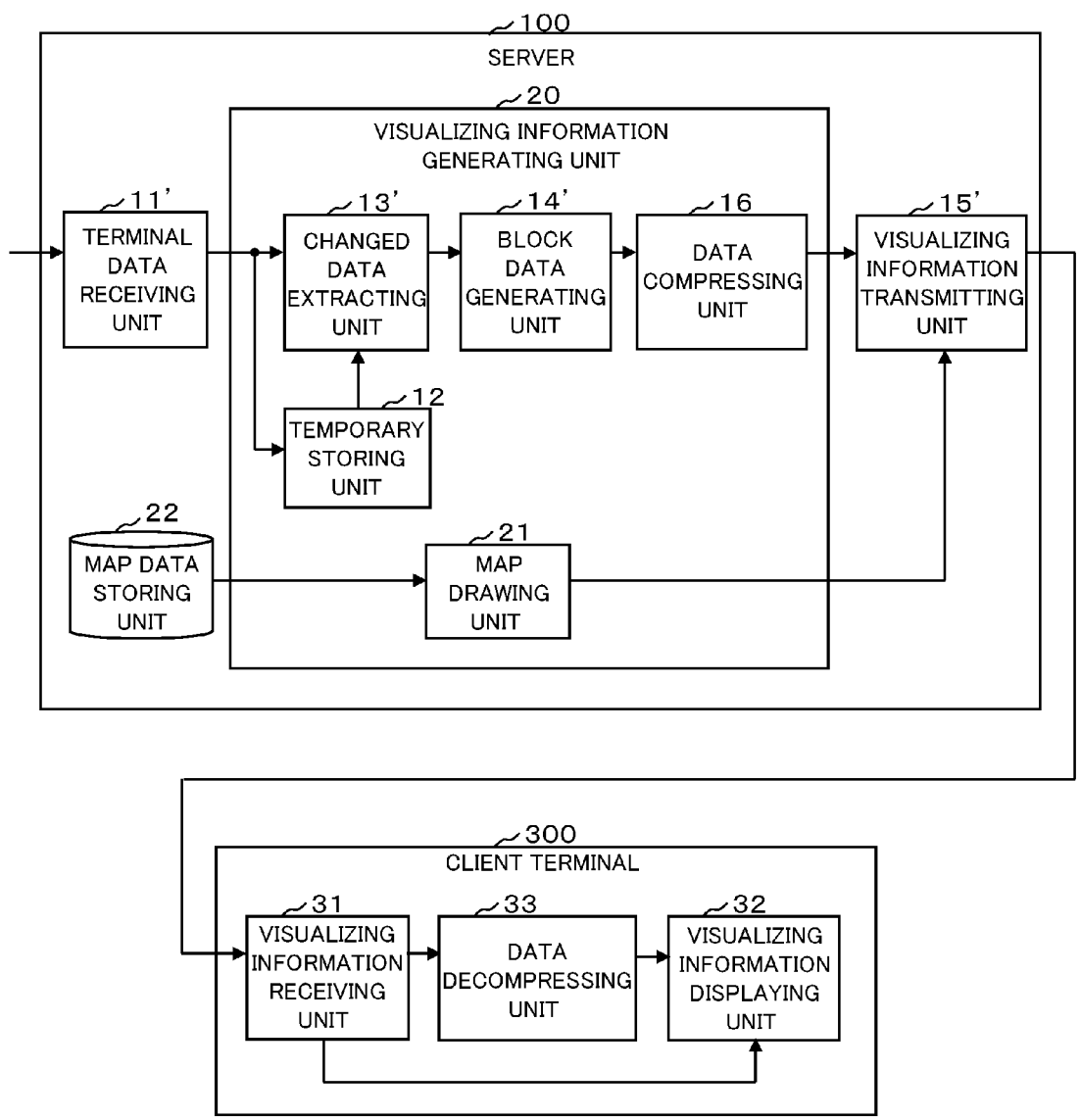
FIG. 12 is a block diagram showing another example of the functional structure of the information visualizing system according to the fourth embodiment.

Also in the fourth embodiment, as shown in FIG. 12, the data compressing unit 16 described in the second embodiment may further be provided. In this case, the current position information is of a numeric type and the management information is of a character type. Accordingly, the data compressing unit 16 to be provided in the visualizing information generating unit 20 rearranges a plurality of block data generated by the block data generating unit 14' in such a manner that changed data on the current position information of the numeric type are arranged consecutively to each other and changed data on the management information of the character type are arranged consecutively to each other, and furthermore, compresses a serial data thus rearranged by a predetermined compressing method.

In this case, the visualizing information transmitting unit 15' transmits the compressed data generated by the data compressing unit 16 and the map image data drawn by the map drawing unit 21 to the client terminal 300 to be a display request source. The visualizing information receiving unit 31 of the client terminal 300 receives the visualizing information (the compressed data and the map image data) transmitted by the visualizing information transmitting unit 15'.

The client terminal 300 further includes a data decompressing unit 33 in addition to the visualizing information receiving unit 31 and the visualizing information displaying unit 32 shown in FIG. 9. The data decompressing unit 33 decompresses the compressed data received by the visualizing information receiving unit 31 into block data. The visualizing information displaying unit 32 updates the drawing of the pin mark 50 based on at least one of the current position and the management information which are indicated by the corresponding changed data and displays the updated drawing in superimposition on the map image every identification information included in the block data on the basis of the block data decompressed by the data decompressing unit 33 and the map image data received by the visualizing information receiving unit 31.

Moreover, the changed data extracting unit 13' may extract the reference data and the difference data as the changed data together with the respective identification information in the same manner as in the third embodiment. In particular, in relation to the current position information of the numeric type, it is preferable to extract the reference data and the difference data as the changed data. For example, in the case in which the current position information is constituted by latitude and longitude information, a compressing effect can be enhanced.

For easy understanding, description will be given based on only a latitude. For example, it is assumed that the current position information (longitude) of the IDs 1 to 4 in the following are extracted as the changed data by the changed data extracting unit 13'.

ID1: 35.690024
ID2: 35.681382
ID3: 35.658544
ID4: 35.629365

In the case in which there are four changed data, the changed data of ID 1 is determined as a reference. In relation to the IDs 2 to 4, difference data are calculated in accordance with the first example. Thus, the following result is obtained.

ID1: 35.690024
ID2: 0.008642 (=35.690024−35.681382)
ID3: 0.022838 (=35.681382−35.658544)
ID4: 0.029179 (=35.658544−35.629365)

Herein, it is sufficient that precision in the latitude and longitude has six decimal places. In the case of a fixed digit, a head of "0.0" can further be reduced in the following manner.

ID1: 35.690024
ID2: 08642
ID3: 22838
ID4: 29179

A map image shown in FIG. 11 is rarely seen in a wide region at a global level and is often zoomed up to a prefecture or municipality level and is thus seen in a narrow region. In that case, a latitude and a longitude of data present in the screen have very approximate values. For this reason, the compression described above is effective. It is apparent that an efficiency is increased with an increase in the number of the portable terminals 200.

The first to fourth embodiments are only illustrative for concreteness to carry out the present invention and the technical scope of the present invention should not be thereby construed to be restrictive. In other words, the present invention can be carried out in various configurations without departing from the gist or main features thereof.

The invention claimed is:
1. An information visualizing system having a plurality of portable terminals and a server connected through a network and serving to analyze data collected in the server from the portable terminals, to visualize a result of the analysis, to provide the visualized result to a terminal of a display request source, and to display the visualized result thereon, wherein the server includes:
a terminal data receiving unit for repetitively receiving, from the portable terminals, terminal data including current position information and status information representing a situation of a user using the portable terminal as data which might be changed with passage of time;
a visualizing information generating unit for generating visualizing information to display a map image where a mark representing the situation of the user indicated by the status information received by the terminal data receiving unit is drawn in a current position indicated by the current position information received by the terminal data receiving unit; and a visualizing information transmitting unit for transmitting the visualizing information generated by the visualizing information generating unit to the terminal of the display request source, the visualizing information generating unit includes:
- a changed data extracting unit for deciding whether or not present data to be data received at this time are changed from previous data to be data received previously for each of the current position information and the status information to be received from the portable terminals by the terminal data receiving unit, and extracting only changed data to be the present data which are changed together with respective identification information; and
- a block data generating unit for collecting, into one, a plurality of the changed data which are extracted by the changed data extracting unit and having the same value, and associating the one changed data thus collected with a plurality of identification information corresponding respectively to the plurality of the changed data to generating block data, wherein the visualizing information transmitting unit transmits the block data generated by the block data generating unit and data on the map image to the terminal of the display request source, and the terminal of the display request source includes a visualizing information displaying unit for updating drawing of the mark based on at least one of a current position of the portable terminals and the situation of the user using the portable terminal which are indicated by the corresponding changed data, and displaying the updated drawing in superimposition on the map image every identification information included in the block data on the basis of the block data and the data on the map image which are transmitted by the visualizing information transmitting unit.

2. The information visualizing system according to claim 1, wherein the changed data extracting unit sets, as reference data, any of the changed data which are extracted, calculate a difference between the changed data other than the reference data and the other changed data, and extracts the reference data and difference data as the changed data together with respective identification information.

3. The information visualizing system according to claim 1, wherein the block data generating unit sets any of the generated block data as reference data and calculates a difference between the changed data in the block data other than the reference data and the changed data in the other block data.

4. The information visualizing system according to claim 2, wherein the current position information is constituted by latitude and longitude information.

5. The information visualizing system according to claim 3, wherein the current position information is constituted by latitude and longitude information.

6. The information visualizing system according to claim 1, wherein the status information is information representing an action state of an employee who is the user using the portable terminal.

* * * * *